H. M. DUDLEY.
FIBER TREATING MACHINE.
APPLICATION FILED JUNE 15, 1917.

1,274,524.

Patented Aug. 6, 1918.
5 SHEETS—SHEET 1.

Inventor
Howard M. Dudley
By his Attorney
Howard Freeman

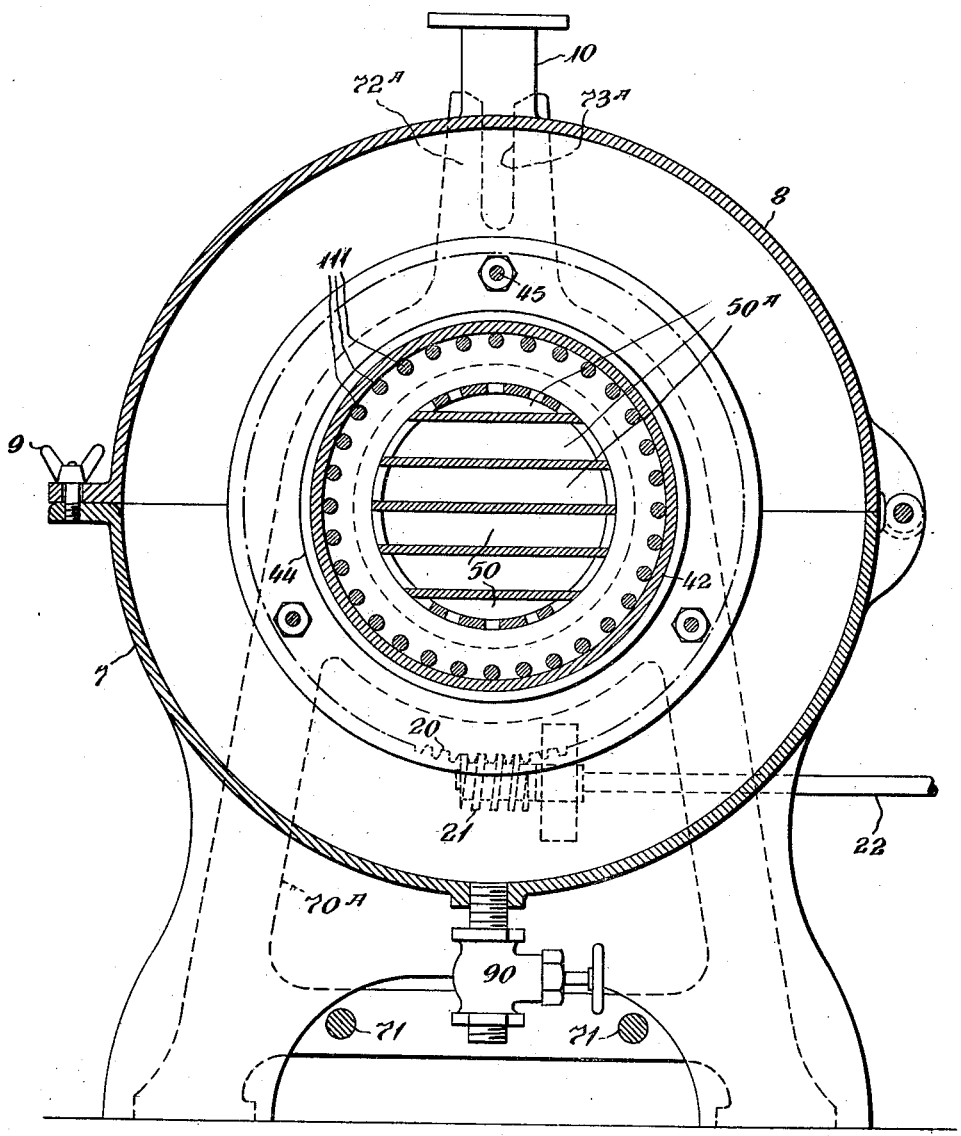

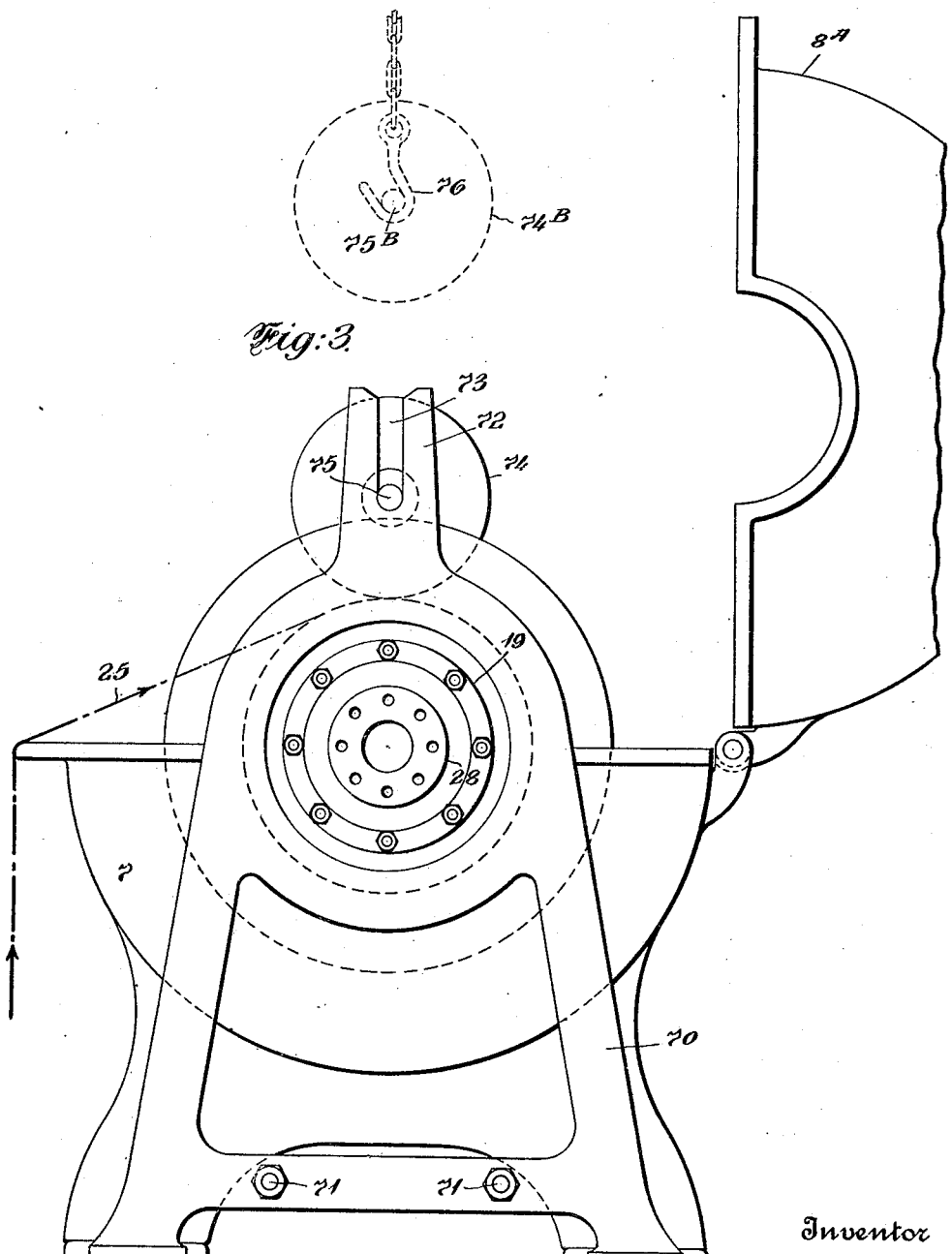

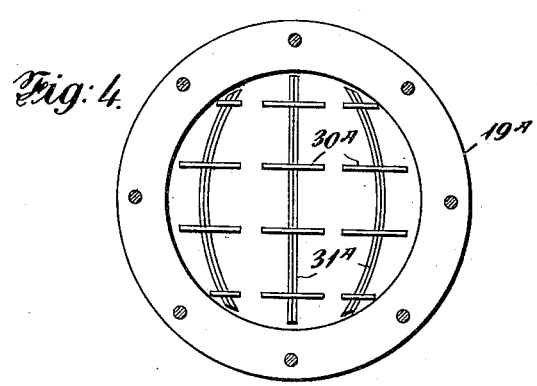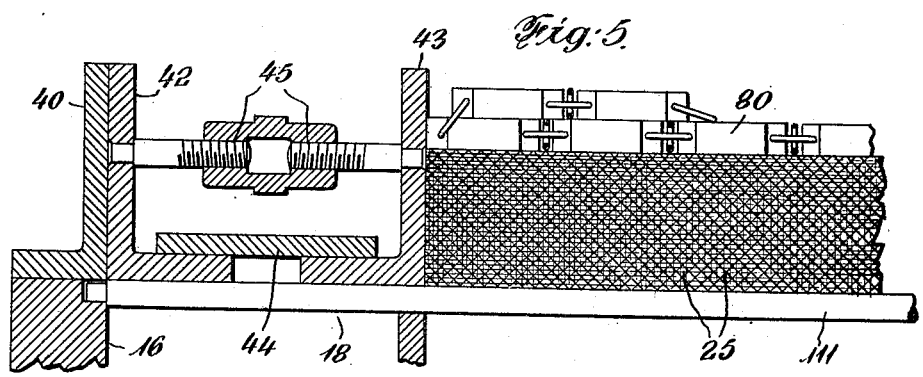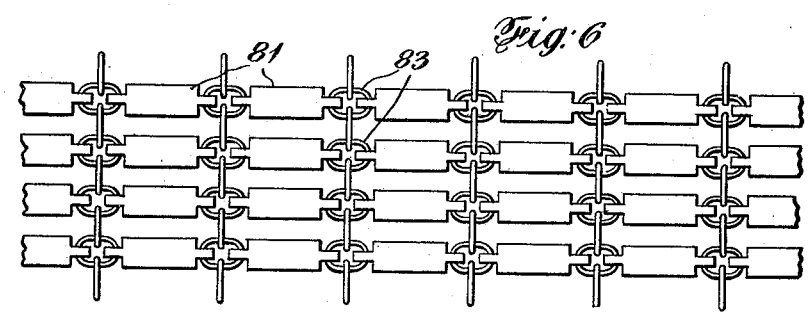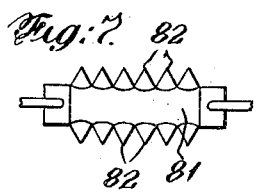

H. M. DUDLEY.
FIBER TREATING MACHINE.
APPLICATION FILED JUNE 15, 1917.
1,274,524.
Patented Aug. 6, 1918.
5 SHEETS—SHEET 5.
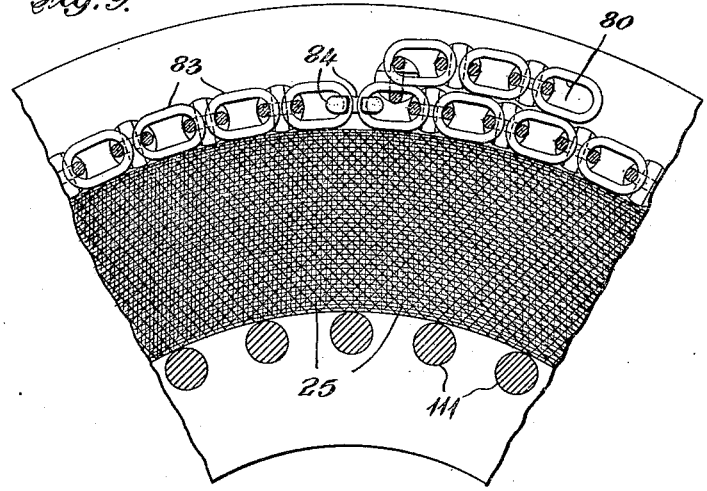
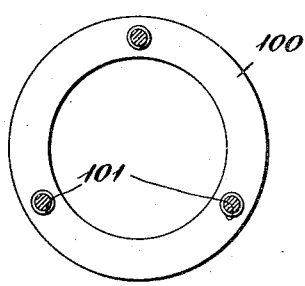
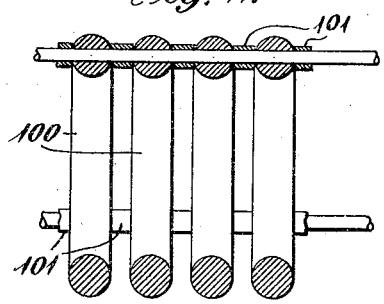
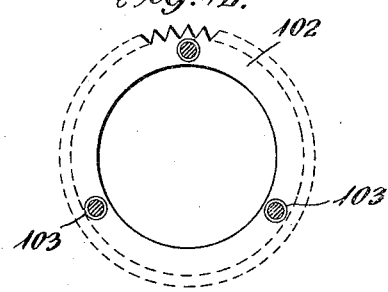
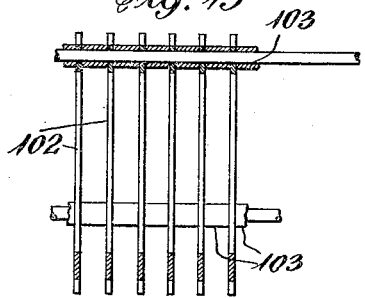
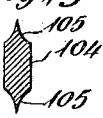

UNITED STATES PATENT OFFICE.

HOWARD M. DUDLEY, OF PHILADELPHIA, PENNSYLVANIA.

FIBER-TREATING MACHINE.

1,274,524.   Specification of Letters Patent.   Patented Aug. 6, 1918.

Application filed June 15, 1917. Serial No. 174,863.

*To all whom it may concern:*

Be it known that I, HOWARD M. DUDLEY, a citizen of the United States, and a resident of Philadelphia, in the county of Philadelphia and State of Pennsylvania, have invented certain new and useful Improvements in Fiber-Treating Machines, of which the following is a specification.

My invention relates to improvements in fiber treating machines and refers particularly to machines adapted to the dyeing, steaming and crabbing of piece goods.

In the dyeing of goods in the piece, the greatest care must be exercised in order to cause complete penetration of the dyestuff and even shades.

The dyeings of many dyestuffs require an after-treatment with such products as metallic-salts, or oxidizing agents in order to develop the best results. It is also necessary to thoroughly wash the goods at various stages of the operation and to dry them when finished.

As each one of these operations has an effect upon the results, it is essential that all of the treatments be uniform throughout the fiber and that they be readily controlled.

One object of my invention is a device in which the piece goods may be uniformly subjected to a solution of a dye.

Another object of my invention is a device in which thorough penetration of textile fabrics may be effected by either a liquid or steam.

Another object of my invention is a device in which dyed fabrics may be uniformly and thoroughly after-treated with a liquid, air or gas.

Another object of my invention is a device in which the fabrics may be thoroughly dried.

Another object of my invention is a device in which fabrics may be dyed, washed, after-treated and dried in a thorough and uniform manner without handling them.

Another object of my invention is a device in which piece goods may be crabbed, steamed, dyed, after-treated and dried without removal from the device.

Another object of my invention is a means whereby the device may be readily and effectively adjusted to conform with fabrics of different widths.

Other objects of my invention will be evident upon a consideration of my specification and claims.

In the accompanying drawings, which illustrate several modifications of the device of my invention, similar parts are designated by similar numerals.

Fig. 2 is a cross-section through the line 2—2 of Fig. 1.

Fig. 3 is an end view of Fig. 1 looking in the direction of the arrow 3.

Fig. 4 is a cross-section through the line 4—4 of Fig. 1.

Fig. 5 is an enlarged broken cross-section showing in detail the means for closing a portion of one of the foraminous plates.

Fig. 6 is a top plan view of the chain covering.

Fig. 7 is a broken vertical cross-section of the chain covering.

Fig. 8 is an end view of one of the rods of the chain covering.

Fig. 9 is a broken cross-section showing the means for applying the chain covering to the rolled fabric.

Fig. 10 is an end view of Fig. 11.

Fig. 11 is a broken top plan view of a modified form of a foraminous plate comprised of spaced rings.

Fig. 12 is an end view of Fig. 13.

Fig. 13 is a broken top plan view of a modified form of a foraminous plate comprised of a series of serrated spaced rings.

Fig. 14 is a broken top plan of a modified form of a foraminous plate comprised of a series of parallel bars having upwardly and downwardly extended members.

Fig. 15 is an end view of Fig. 14.

Figure 1:
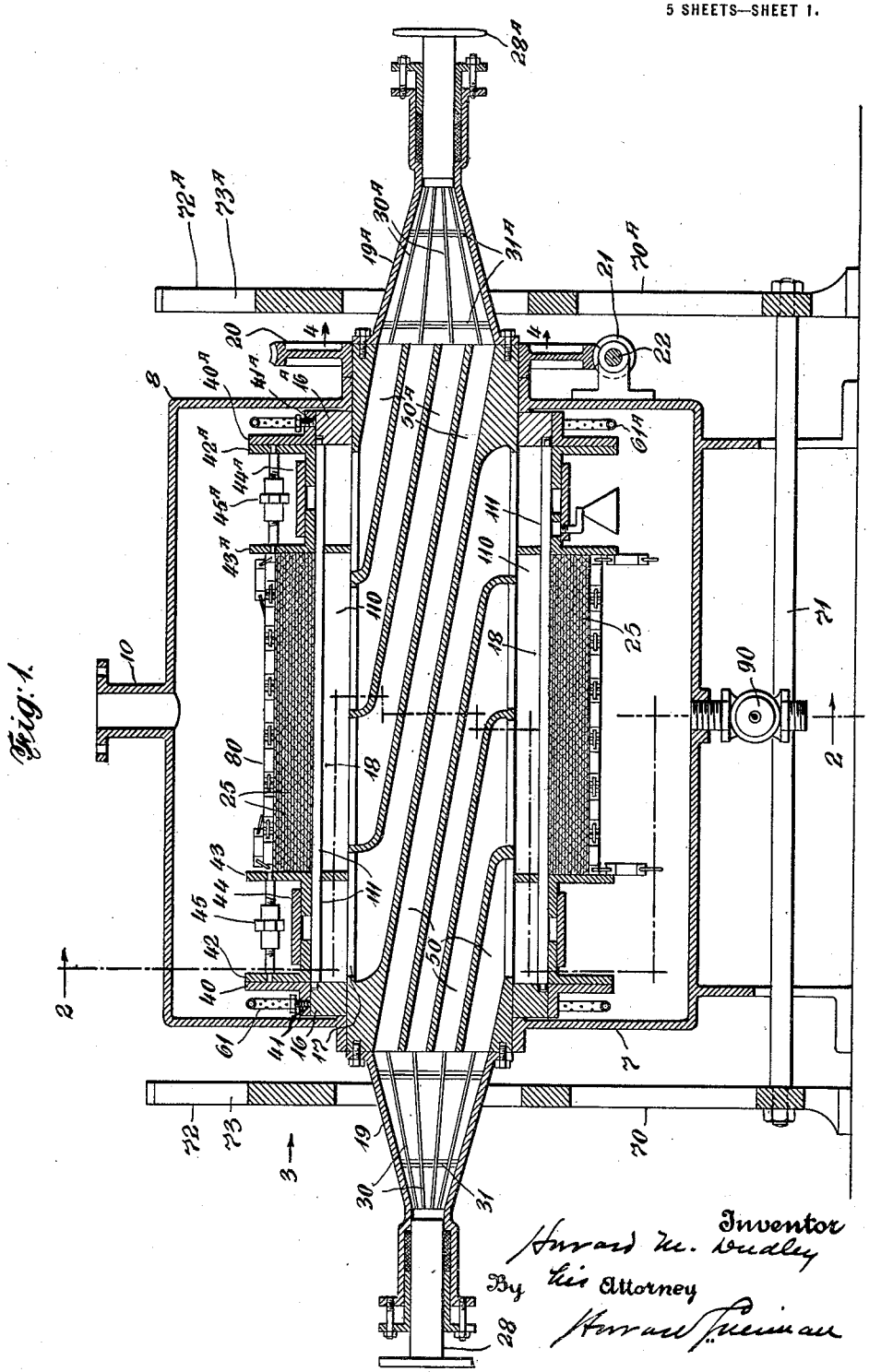
Figure 1 is a vertical cross-section of one form of my device.

The particular form of my device, as illustrated, comprises a dyeing chamber formed by the bottom member 7 and the top member 8, hingedly attached thereto and capable of being held in intimate contact by means of the screw bolts 9, 9. A pipe 10, opening into the top of the dyeing chamber is connected to a system (not shown) whereby the liquid passing from the dyeing chamber may be returned for repassage through said chamber.

Within the dyeing chamber is a reel, around which the cloth to be dyed or treated is wound, comprising the two end flanges 16, 16$^A$, to which are fixedly attached the two annular foraminous plates 17, 18. The two flanges 16, 16$^A$ extend into the shells 19, 19$^A$ of the hollow core of the reel extending outwardly from opposite ends of the dyeing chamber. Fixedly attached to the shell 19$^A$ is a cogged wheel 20, meshing with the worm gear 21 which is fixedly attached to the shaft 22, from which a revoluble movement may be imparted to the shells 19, 19$^A$ and the reel. Extending into the shells 19, 19$^A$ are the pipes 28, 28$^A$ around which the shells 19, 19$^A$ are revoluble. The pipes 28, 28$^A$ are connected to a source of liquid, steam or air supply.

In order to reduce the width of the foraminous plate 18 through which the liquor passes to coincide with the width of the fabric to be treated, the following device is employed. The flanges 16, 16$^A$ carry annular outwardly extended abutting members 40, 40$^A$ fixedly attached thereto by a series of bolts 41, 41$^A$. Surrounding the foraminous plate 18 and abutting thereon are the angular annular members 42, 43, 42$^A$, 43$^A$ which are sildable upon the foraminous plate 18. These members 42, 43, 42$^A$, 43$^A$ are held upon the foraminous plate 18 by the annular members 44, 44$^A$, the members 42, 43, 42$^A$, 43$^A$ being slidable between the members 44, 44$^A$ and the foraminous plate 18. The members 42 and 43, and 42$^A$ and 43$^A$, are distanced from each other respectively by the right and left threaded screw members 45, 45$^A$ abutting upon the members 42, 43, and 42$^A$, 43$^A$.

The foraminous plate 17 comprises a series of openings connected with the series of tubular members 50, 50, 50$^A$, 50$^A$, said tubular members extending from the plate 17 outwardly to the members 19, 19$^A$.

Within the conical members 19 and 19$^A$ are a series of divergent plates 30, 30, 30$^A$, 30$^A$, supported by the members 31, 31, 31$^A$, 31$^A$.

The foraminous plate 18 comprises a series of parallel spaced bars 111.

In order that the cloth 25 may be wound evenly upon the reel, the following device is employed: The two supports 70, 70$^A$ are connected by the bars 71, 71. The upper portions 72, 72$^A$ of the supports 70, 70$^A$ have vertical slots 73, 73$^A$. A heavy roller 74 has the shaft 75 capable of being carried within the slots 73, 73$^A$ and revoluble therein. A means, as the hoisting hook 76 is capable of removing the roller 74 and the shaft 75 from the slots 73, 73$^A$.

A chain cover 80 suitable for encompassing the rolled cloth 25 is comprised as follows: A series of links 81, 81, having upwardly and downwardly extended cone members 82, 82 are connected together by the links 83, 83, in such a manner that the links of the chain cover 80, may be folded over to reduce either the length or width of the cover, and any suitable clamp 84 may be employed to maintain the chain cover in close position around the cloth 25.

A valve 90 allows the liquor to be drained from the dyeing chamber.

In the modification shown in Figs. 10 and 11, the parallel bars 111, 111 of the foraminous plate 18 are replaced by a series of parallel spaced rings 100, 100, supported by the members 101, 101.

In the modification shown in Figs. 12 and 13, the parallel bars 111, 111 of the foraminous plate 18 are replaced by a series of parallel spaced serrated rings 102, 102 supported by the members 103, 103.

In the modification shown in Figs. 14 and 15, the parallel bars 111, 111 of the foraminous plate 18 are replaced by a series of parallel spaced bars 104, 104, having the upwardly and downwardly extended members 105, 105.

The operation of the device is as follows: The top 8 of the device is raised into the position 8$^A$, Fig. 3, the cloth 25 attached to the reel upon the foraminous plate 18. By turning the right and left screw members 45, 45$^A$, the members 43, 43$^A$ are brought into position against the sides of the fabric, the members 42, 43, 44, 42$^A$, 43$^A$, 44$^A$ closing all of the openings in the foraminous plate 18 except those immediately beneath the fabric. The roller 74 is then placed upon the cloth and the device revolved, thus winding the cloth upon the reel, the roller 74 maintaining the cloth in a smooth condition. When the cloth is wound, the roller 74 is raised into the position 74$^B$ by means of the hooks 76, 76. The right and left screw members are then employed to form a close engagement between the edge of the rolled fabric and the outer faces of the members 43, 43$^A$. The top 8 is then closed and clamped.

The pipes 28, and 28$^A$ are now connected with a source of dye-liquor, water, steam or air, as desired, and the particular operation continued during the revolution of the reel.

The reactive agent passes through the pipes 28, 28$^A$, between the plates 30, 30$^A$, of the conical members 19, 19$^A$, the tubes 50, 50$^A$, the foraminous plate 17, the chamber 110, the foraminous plate 18, the fabric 25 and the chain cover 80 into the receptacle, from which it flows through the pipe 10 for continuous circulation if desired.

I do not limit myself to the particular size shape, number or arrangement of parts as shown and described, all of which may be varied without going beyond the scope of my invention as described and claimed.

What is claimed, is:

1. In a fiber treating machine, in combination, a foraminous cylinder capable of having a fabric wound thereon, an outwardly extended flange fixedly attached to each end of said cylinder, a series of annular members abutting upon said cylinder slidable over said cylinder oppositely to each other and capable of closing a portion of the openings in the cylinder and means for maintaining the members in any predetermined position over the cylinder.

2. In a fiber treating machine, in combination, a foraminous cylinder capable of having a fabric wound thereon, an outwardly extended flange fixedly attached to each end of the cylinder, a plurality of series of annular members abutting upon the cylinder, means whereby the annular members of a series may be separated at any predetermined distance from each other to abut upon the flange and a fabric wound upon the cylinder closing the openings in the cylinder between the flange and the fabric and means for forcing liquids, steam and air through the unclosed openings in the cylinder.

3. In a fiber treating machine, in combination, a foraminous cylinder capable of having a fabric wound thereon, an outwardly extended flange fixedly attached to each end of the cylinder, a plurality of series of annular members abutting upon the cylinder, means whereby the annular members of a series may be separated at any predetermined distance from each other to abut upon the flange and a fabric wound upon the cylinder closing the openings in the cylinder between the flange and the fabric, means for revolving the cylinder and means for passing liquids, steam and air through the unclosed openings of the cylinder and through the fabric.

4. In a fiber treating machine, in combination, a foraminous cylinder capable of having a fabric wound thereon, an outwardly extended flange fixedly attached to each end of the cylinder, a plurality of series of annular members abutting upon the cylinder, means whereby the annular members of a series may be separated at any predetermined distance from each other to abut upon the flange and a fabric wound upon the cylinder closing the openings in the cylinder between the flange and the fabric, a flexible foraminous covering capable of being adjusted to closely cover the fabric when wound upon the cylinder and means for forcing liquids, steam and air through the openings in the cylinder within the wound fabric, the fabric and the cover.

5. In a fiber treating machine, in combination, a receptacle, an outer foraminous cylinder within the receptacle capable of having a fabric wound thereon, a second foraminous cylinder spaced within the first cylinder, outwardly extended flanges at each end of the cylinders, a plurality of series of annular members abutting upon the outer face of the outer cylinder, means for separating the members of each series to abut upon the edge of a fabric rolled upon the outer cylinder closing all the openings in the outer cylinder except those around which the fabric is wound, means for maintaining the members in abutment against the fabric, means for revolving the cylinders and means for passing liquids, steam and air through the cylinders and the fabric during their revolution.

6. In a fiber treating machine, in combination, a receptacle, an outer foraminous cylinder within the receptacle capable of having a fabric wound thereon, a second foraminous cylinder spaced within the first cylinder, outwardly extended flanges at each end of the cylinders, a plurality of series of annular members abutting upon the outer face of the outer cylinder, means for separating the members of each series to abut upon the edge of a fabric rolled upon the outer cylinder closing all the openings in the outer cylinder except those around which the fabric is wound, means for maintaining the members in abutment against the fabric, means for revolving the cylinders, tubular members connecting the openings in the inner cylinder to a supply source of liquids, steam and air, a flexible foraminous covering capable of being adjusted to closely cover the wound fabric, and means for forcing liquids, steam and air outwardly through the device and the fabric wound upon the outer cylinder.

7. In a fiber treating machine, in combination, a foraminous cylinder comprising a series of spaced parallel members capable of having a fabric wound thereon, an outwardly extending flange fixedly attached to each end of said cylinder, a series of annular members abutting upon said cylinder slidable over said cylinder oppositely to each other and capable of closing a portion of the openings in the cylinder and means for maintaining the members in any predetermined position over the cylinder.

8. In a fiber treating machine, in combination, a receptacle, an outer foraminous cylinder comprising a series of spaced parallel members having upwardly and downwardly extended projections within the receptacle, an inner foraminous cylinder spaced from the outer cylinder, tubular members connecting the openings in the inner cylinder with a supply source of liquids, steam and air, a series of slidable members abutting upon the outer face of the outer cylinder, slidably movable from each other to abut upon a fabric wound upon the cylinder closing all of the openings in the cylinder except those covered by the fabric, a flexible foraminous covering capable of close engagement with the exterior surface of the wound fabric, means for revolving the cylinders and the fabric and means for forcing liquids, steam and air through the device and the fabric during the revolution.

Signed at New York city, in the county of New York and State of New York, this 4th day of June, 1917.

HOWARD M. DUDLEY.

Copies of this patent may be obtained for five cents each, by addressing the "Commissioner of Patents, Washington, D. C."